Nov. 1, 1960     D. I. TRUFANOFF     2,958,847
AIRCRAFT LANDING AID
Filed Dec. 9, 1957     2 Sheets-Sheet 1
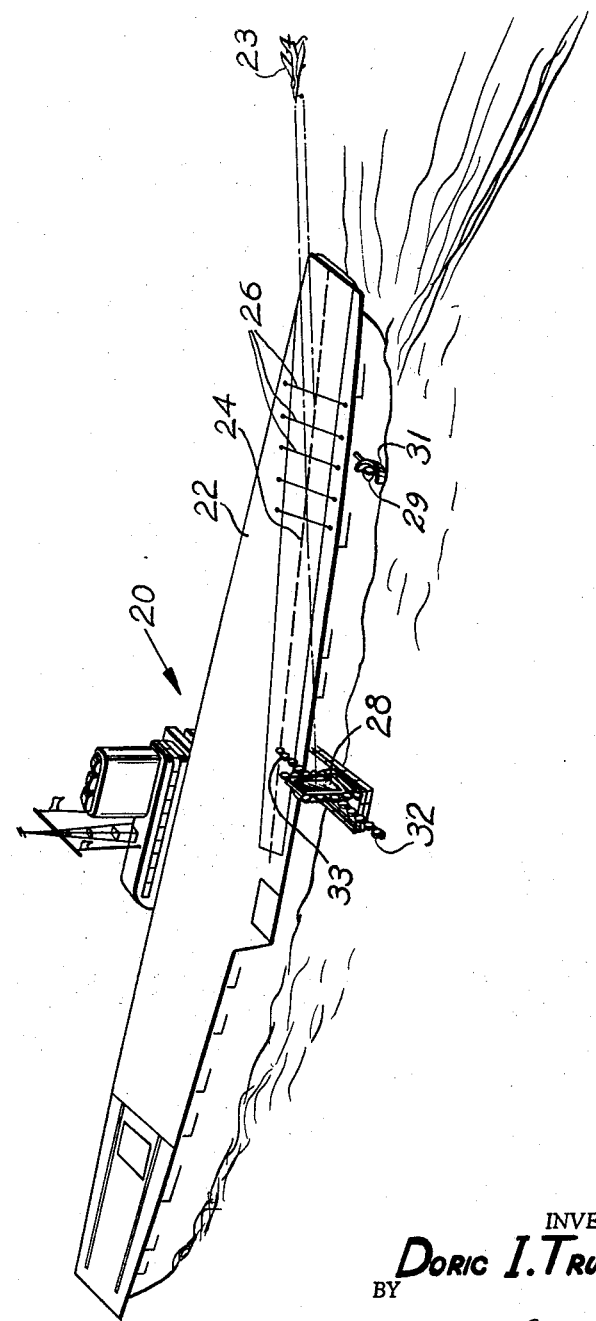
INVENTOR.
Doric I. Trufanoff
BY
Eli Weiss
ATTORNEY Nov. 1, 1960 D. I. TRUFANOFF 2,958,847
AIRCRAFT LANDING AID
Filed Dec. 9, 1957 2 Sheets-Sheet 2
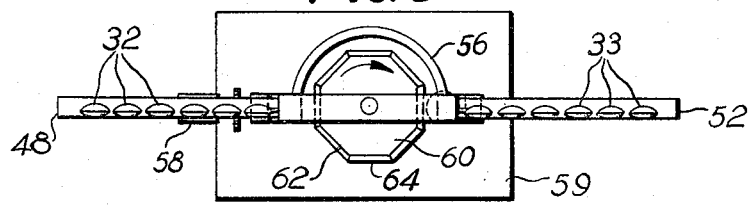
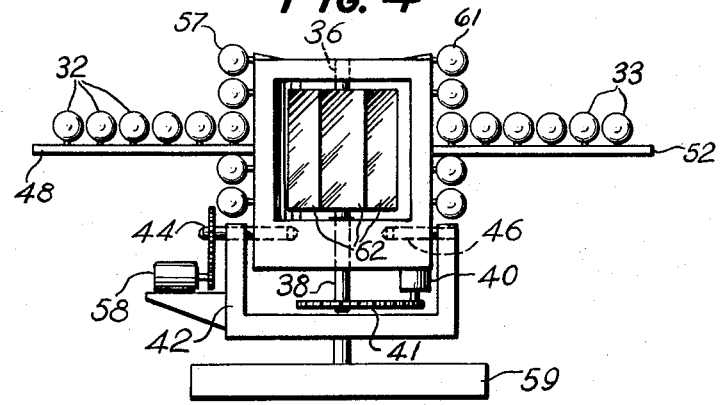
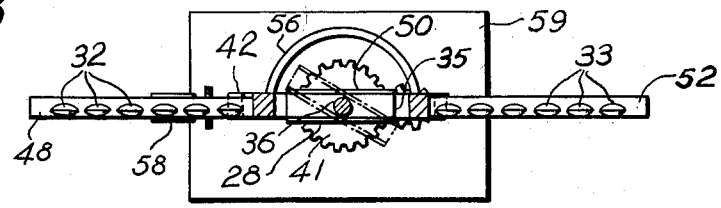
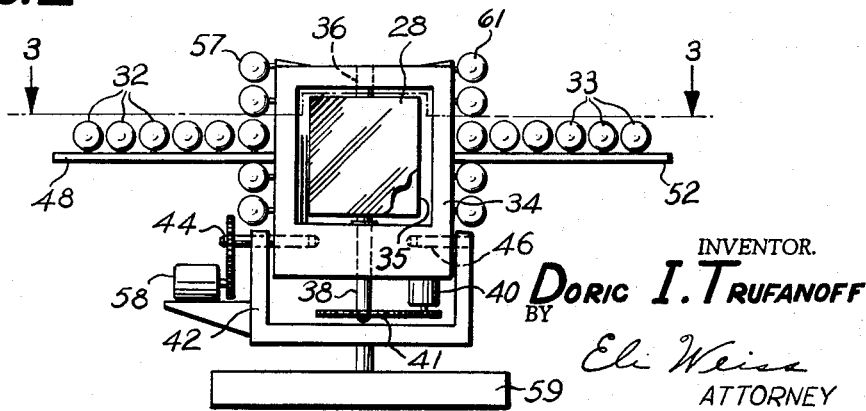
INVENTOR.
Doric I. Trufanoff
BY Eli Weiss
ATTORNEY United States Patent Office 2,958,847
Patented Nov. 1, 1960

2,958,847
AIRCRAFT LANDING AID

Doric I. Trufanoff, Massapequa, N.Y., assignor, by mesne assignments, to Burroughs Corporation, a corporation of Michigan Filed Dec. 9, 1957, Ser. No. 701,662

6 Claims. (Cl. 340—26)

This invention relates generally to an aircraft landing aid and more particularly to an improved optical device that defines a desired glide path to facilitate the safe landing of an airplane.

One of the principal benefits derived from the use of an optical aircraft landing aid as described in U.S. Patent Number 2,784,925 issued to H. C. N. Goodhart on March 12, 1957, is the ease of orienting an aircraft accurately along a prescribed glide path when landing by aligning a reflected image of a light source, as viewed through a curved mirror, with an interrupted row of directly viewed light sources.

The curved mirror is positioned centrally between a row of directly viewed stationary light sources and tilted at a predetermined angle to an aircraft landing area to reflect the image of a remotely positioned light source. A pilot, when coming in for a landing, sees a row of light sources extending horizontally outward from each side of the mirror; and the image of a light source reflected by the mirror. The alignment of the image of the remote light source, as viewed through the curved mirror, with the directly viewed row of light sources defines the desired glide path angle in elevation, from the mirror, for the pilot to maintain. With this device, a relatively small deviation in altitude of the aircraft from the defined descent path is indicated by an appreciable vertical displacement of the image of the reflected light source relative to the directly viewed row of light sources.

However, as noted in U.S. Patent Number 2,784,925, a plane mirror cannot be successfully substituted for a curved mirror without reducing substantially the coverage of the system in azimuth. Therefore, H. C. N. Goodhart discloses a mirror curved in horizontal section, though remaining straight in any vertical section to provide a device that presents wide coverage in azimuth.

Unfortunately, however, a curved mirror is expensive to fabricate.

This invention overcomes the difficulty of narrow coverage inherent with plane mirrors.

It is a primary object of this invention to provide an improved aircraft landing aid that utilizes a plane mirror to present a display that can be detected over a wide range in azimuth.

It is another object of this invention to provide an improved aircraft landing aid that is economical to produce and reliable in operation.

It is a feature of this invention to provide an improved aircraft landing aid that can sustain partial permanent damage and still function properly.

Other objects and features and many of the attendant advantages of this invention will be readily appreciated as the apparatus becomes better understood by reference to the following deatiled description when considered in connection with the accompanying drawings wherein:

Fig. 1 is a perspective view of structure in accordance with the principles of this invention positioned adjacent to the flight deck of an aircraft carrier;

Fig. 2 is a front view of a plane mirror assemblage;

Fig. 3 is a view along the lines 3—3 of Fig. 2;

Fig. 4 is a front view of another embodiment in accordance with the principles of this invention; and Fig. 5 is a top view of the embodiment shown in Fig. 4.

Similar reference characters refer to similar parts throughout the several views of the drawing.

Briefly, an optical assemblage is provided to aid an aircraft pilot direct his airplane along a defined glide path to insure a safe landing on a short runway. In the optical assemblage, a plane mirror rotatably supported along a vertical axis is positioned centrally between a horizontally oriented row of stationary light sources. A remotely positioned guide light source is positioned in front of the mirror.

In operation, the row of light sources are viewed directly and the image of the guide light source is viewed through the rotating mirror. The alignment of the image of the guide light in the rotating plane mirror with the directly viewed rows of light sources indicates to the airplane pilot that he is flying along the glide path defined for landing. An upward displacement of the image of the guide light relative to the directly viewed rows of light sources indicates to the pilot that he is flying along a path that is too high; and a downward displacement of the image of the guide light relative to the directly viewed rows of light sources indicates to the pilot that he is flying along a path that is too low. In this manner a continuous display is presented to the pilot to indicate his position relative to a desired glide path.

The rotatable plane mirror is economical to produce and presents a reflected image that is visible over a wide range in azimuth.

With reference to Fig. 1, there is disclosed a short aircraft landing area in the form of an aircraft carrier 20 that supports an angled flight deck 22. The deck displays the usual center line marking 24 and supports arrestor wires 26 arranged transverse to the landing area for engagement with the arrestor hook on the aircraft.

The normal landing approach of an airplane 23 to an aircraft carrier is along a curved path in azimuth before turning into alignment with the center line marking 24 on the flight deck. Therefore, it is desirable to present a display that is visible over a wide range in azimuth to allow a pilot as much time as possible to accurately position his airplane along the desired glide path. A wide angle display in azimuth allows the pilot to assume the proper glide path when he is on his crosswind leg, and possibly when he is on his down-wind leg.

A plane mirror 28 rotatably supported about a vertical axis is positioned adjacent to one side of the landing area 22. In some instances, however, where this invention is utilized on an airfield it may be possible to position the mirror within a depressed area at one end of the runway rather than to one side of the runway.

A first source of light 29 that functions as a guide light is positioned in front of the plane mirror. A deep reflector 31 positioned around the light source 29 directs a maximum amount of light towards the plane mirror 28, and also shields the light source from direct view by a pilot. A horizontal array of aligned stationary light sources 32, and 33 extend horizontally outward from a point adjacent to each side of the rotatable plane mirror.

With reference to Figs. 2 and 3, there is shown the rotatable plane mirror assemblage in greater detail.

The mirror 28, made of flat plate glass or the like coated with a highly reflective material is mounted on one side of a rigid plate 35 that is rotatably connected to a supporting frame 34 by means of support shafts 36 and 38. An electric motor 40, mounted securely to the supporting frame 34 is coupled to the support member 38 through gears 41 to rotate the rigid plate 35 and, therefore, the plane mirror 28 about a vertical axis. The supporting frame 34 is pivotally coupled to a yoke 42 by supporting shafts 44 and 46. An orienting motor 58 mounted to the yoke 42 is coupled to the shaft 44 through gears to tilt the plane mirror about a horizontal axis to a desired angle to provide the optimum glide path for the approaching airplane. A first horizontal member 48, rigidly coupled to a vertical member of the supporting frame 34, supports a first row of reference light sources 32. A second horizontal member 52 aligned with the first horizontal member 48 is secured rigidly to the other vertical member of the supporting frame 34 and supports a second row of reference light sources 33. The two rows of reference light sources 32 and 33 are aligned with each other to present an interrupted row of reference light sources.

A shield 56, connected to the rear of the supporting frame 34, protects the mirror from damage and also limits the range of the light reflected by the mirror to approximately one hundred and eighty degrees in azimuth.

In operation the mirror assemblage is positioned adjacent to and aligned with an aircraft landing area, the first and second rows of aligned light sources 32 and 33 are energized to present an interrupted row of reference lights; and the guide light source 29 is energized. The motor 58 is driven through a predetermined angle to orient the plane mirror about a horizontal axis to present a desired glide path, and the motor 40 is energized to drive the plane mirror 28 continuously at a predetermined speed about a vertical axis to present an image of the light source 29 over a range of one hundred and eighty degrees. The plane mirror is rotated at a speed in excess of sixteen revolutions per second to present, through the phenomena of persistence of vision, a continuous image to an observing pilot when a single reflective surface is utilized.

If more than one reflective surface is utilized, a continuous image will be sensed by an observer if the mirror is rotated to present a minimum of sixteen images per second.

The pilot, when approaching the aircraft carrier for a landing, will see a straight line continuous image of the guide light source 29 extending across the rotating plane mirror 28 and positioned between the interrupted row of reference light sources 32 and 33. The alignment of the reflected image of the guide light source 29 (which appears as a line or bar of light extending across the mirror) with the interrupted row of light sources 32 and 33 indicates that the airplane is positioned along the desired glide path.

An upward displacement of the bar of light displayed by the mirror relative to the aligned reference light sources indicates that the aircraft is too high; and a downward displacement of the bar of light displayed by the mirror relative to the aligned reference light sources indicates that the aircraft is too low.

When this invention is utilized on an aircraft carrier the mirror unit should be stabilized against roll and pitch by a gyro stabilized platform 59.

In some instances it may be desirable to "wave off" a pilot prior to landing. This can be accomplished by flashing red warning lights positioned to form a vertical row 57, 61 adjacent to each side of the supporting frame 34.

With reference to Figs. 2 and 3, the speed of rotation of the plane mirror can be reduced one half by securing a second plane mirror 50 to the opposite side of the rigid plate 35. With two plane mirrors, a rotational speed of eight revolutions per second instead of sixteen revolutions per second of the rigid plate 35 will present a continuous image of the guide light source 29.

It should be noted that by substituting an arm type of linkage in place of the gears 41 between the motor 40 and the support shaft 38, the mirror 28 will oscillate back and forth about a vertical axis. To obtain a continuous display visible over a range of one hundred and eighty degrees in azimuth the plane mirror is oscillated back and forth sixteen times per second through an angular displacement of ninety degrees.

With reference to Figs. 4 and 5, there is disclosed another embodiment in accordance with the principles of this invention wherein a shaped drum 60 is substituted for the rigid plate 35 of Fig. 2. For convenience it shall be assumed that the drum 60 has eight vertically positioned flat surfaces 62 to present a hexagon shaped horizontal section. However, a drum having an increased or decreased number of flat surfaces can be used. Each flat surface 62 supports a plane mirror 64 to present an eight sided reflective drum. To present a straight line flicker free image of the guide light source over a range of one hundred and eighty degrees in azimuth, the rotatable drum, since it supports eight plane mirrors, need only be rotated at a speed of approximately two revolutions per second. In this embodiment, total destruction of one or two plane mirrors will not render the invention inoperative.

Obviously many modifications and variations of the present invention are possible in the light of the above teachings. It is therefore to be understood that within the scope of the appended claims the invention may be practiced otherwise than as specifically described.

What is claimed is:

1. An optical aircraft landing device for aiding a pilot to fly his airplane along a prescribed glide path to a landing area comprising a first light source, a plane mirror positioned adjacent to said landing area oriented to reflect an image of the first light source to the pilot of an approaching airplane, a plurality of light sources positioned adjacent to said plane mirror for direct viewing by said pilot, the visual alignment of the image of said first light source with said plurality of light sources defining the prescribed glide path, and oscillating drive means coupled to rock said plane mirror back and forth about a vertical axis to present a bar image of said first light source over a wide range in azimuth.

2. An optical aircraft landing device for aiding a pilot to fly his airplane along a prescribed glide path to a landing area comprising a light source, a plane mirror positioned adjacent to said landing area oriented to reflect an image of the light source to the pilot of an approaching airplane, an interrupted row of light sources positioned horizontally adjacent to said plane mirror for direct viewing by said pilot, the central alignment of the image of said light source with said interrupted row of light sources defining the prescribed glide path, oscillating drive means coupled to rock continuously said mirror back and forth about a vertical axis to present a line image of said light source over a wide range in azimuth, tilting means coupled to orient said plane mirror about a horizontal axis to vary the glide path angle, and stabilizing means coupled to said plane mirror.

3. An optical aircraft landing device for aiding a pilot to fly his airplane along a prescribed glide path to a landing area comprising a first light source, a plane mirror positioned adjacent to said landing area oriented to reflect an image of the first light source to the pilot of an approaching airplane, a plurality of light sources positioned adjacent to said plane mirror for direct viewing by said pilot, the alignment of the image of said first light source with said plurality of light sources defining the prescribed glide path, and rotatable drive means coupled to rotate said plane mirror about a vertical axis to present a line image of said first light source over a wide range in azimuth.

4. An optical aircraft landing device for aiding a pilot to fly his airplane along a prescribed glide path to a landing area comprising a light source, a plane mirror positioned adjacent to said landing area oriented to reflect an image of the light source to the pilot of an approaching airplane, an interrupted row of light sources positioned horizontally adjacent to said plane mirror for direct viewing by said pilot, the central alignment of the image of said light source with said interrupted row of light sources defining the prescribed glide path, and rotatable drive means coupled to rotate said plane mirror about a vertical axis to present a bar image of said light source over a wide range in azimuth.

5. An optical aircraft landing device for aiding a pilot to fly his airplane along a prescribed glide path to a landing area comprising a light source, a plane mirror positioned adjacent to said landing area to reflect an image of the light source to the pilot of an approaching airplane, an interrupted row of light sources positioned horizontally adjacent to said plane mirror for direct viewing by said pilot, the central alignment of the image of said light source with said interrupted row of light sources defining the prescribed glide path, rotatable drive means coupled to rotate said plane mirror about a vertical axis to present a bar image of said light source over a wide range in azimuth, tilting means coupled to orient said plane mirror about a horizontal axis to vary the glide path angle, and stabilizing means coupled to said plane mirror.

6. An optical aircraft landing device for aiding a pilot to fly his airplane along a prescribed glide path to a landing area comprising a first light source, a drum rotatably supported for rotation about a vertical axis, a plurality of plane mirrors secured to said drum to reflect sequentially an image of the first light source to the pilot of an approaching airplane, a plurality of light sources positioned adjacent to said drum for direct viewing by said pilot, the alignment of the image of said first light source with said plurality of light sources defining the prescribed glide path, and rotatable means coupled to rotate said drum about a vertical axis to present a bar image of said first light source over a wide range in azimuth.

References Cited in the file of this patent

UNITED STATES PATENTS

| | | |
|---|---|---|
| 1,629,506 | Jensen | May 24, 1927 |
| 2,059,222 | Fessenden | Nov. 3, 1936 |
| 2,784,925 | Goodhart | Mar. 12, 1957 |